United States Patent
Smague

(10) Patent No.: US 10,634,011 B2
(45) Date of Patent: Apr. 28, 2020

(54) SYSTEM AND METHOD FOR CONTROLLING A CLOSED LOOP WORKING ON A RANKINE CYCLE WITH A TANK AND A PRESSURE REGULATING DEVICE

(71) Applicant: IFP Energies nouvelles, Rueil-Malmaison (FR)

(72) Inventor: Pascal Smague, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 10 days.

(21) Appl. No.: 14/671,088

(22) Filed: Mar. 27, 2015

(65) Prior Publication Data

US 2015/0300210 A1 Oct. 22, 2015

(30) Foreign Application Priority Data

Apr. 16, 2014 (FR) ...................................... 14 53388

(51) Int. Cl.
| | |
|---|---|
| *F01K 9/02* | (2006.01) |
| *F01K 23/06* | (2006.01) |
| *F01K 25/08* | (2006.01) |
| *F01K 3/00* | (2006.01) |
| *F01K 13/02* | (2006.01) |
| *F22D 5/00* | (2006.01) |
| *F22D 5/18* | (2006.01) |

(52) U.S. Cl.
CPC .............. *F01K 9/023* (2013.01); *F01K 3/004* (2013.01); *F01K 13/02* (2013.01); *F01K 23/065* (2013.01); *F01K 25/08* (2013.01); *F22D 5/00* (2013.01); *F22D 5/18* (2013.01); *Y02T 10/166* (2013.01)

(58) Field of Classification Search
None
See application file for complete search history.

(56) References Cited

U.S. PATENT DOCUMENTS

| | | | |
|---|---|---|---|
| 6,571,548 B1 * | 6/2003 | Bronicki | F01K 23/10 60/39.181 |
| 7,174,732 B2 | 2/2007 | Taniguchi et al. | |
| 2004/0050050 A1 * | 3/2004 | Bloch | F01K 13/00 60/651 |
| 2007/0101989 A1 * | 5/2007 | Strathman | F01K 13/00 126/636 |

(Continued)

FOREIGN PATENT DOCUMENTS

| | | | |
|---|---|---|---|
| CN | 102230401 A * | 11/2011 | |
| DE | 102009050068 A1 * | 4/2011 | F02G 5/00 |

(Continued)

*Primary Examiner* — Laert Dounis
(74) *Attorney, Agent, or Firm* — Fitch, Even, Tabin & Flannery LLP

(57) ABSTRACT

The present invention is a device and method for controlling a closed loop (10) working on a Rankine cycle comprising a compression and circulation pump (12) for the liquid fluid, a heat exchanger (20) swept by a hot source (C) for evaporation of the fluid, expansion device (32) for the fluid in vapor form, a cooling exchange (44) swept by a cold source (F) for condensing the working fluid, a working fluid receiving tank (50) and working fluid circulation lines (60, 62, 64, 66, 68). The tank (50) is connected to a pressure regulating system (52, 54).

8 Claims, 1 Drawing Sheet

(56) References Cited

U.S. PATENT DOCUMENTS

| | | | |
|---|---|---|---|
| 2009/0199557 A1* | 8/2009 | Bennett | F01K 3/008 60/641.15 |
| 2012/0210713 A1* | 8/2012 | Ernst | F01N 5/02 60/615 |
| 2012/0227404 A1* | 9/2012 | Schuster | F01K 15/02 60/651 |
| 2012/0325436 A1* | 12/2012 | Shedd | H01L 23/427 165/104.21 |
| 2013/0276446 A1* | 10/2013 | Hall | F01K 23/065 60/615 |
| 2013/0327041 A1* | 12/2013 | Gaertner | F01K 13/02 60/615 |
| 2015/0013338 A1* | 1/2015 | Smague | F01K 13/02 60/645 |
| 2015/0135708 A1* | 5/2015 | Lutz | F01K 23/065 60/618 |
| 2015/0275778 A1* | 10/2015 | Fast | F02B 75/04 123/48 R |

FOREIGN PATENT DOCUMENTS

| | | | |
|---|---|---|---|
| FR | 2884555 A1 | 10/2006 | |
| WO | WO 2014206708 A1 * | 12/2014 | F01N 5/02 |

\* cited by examiner

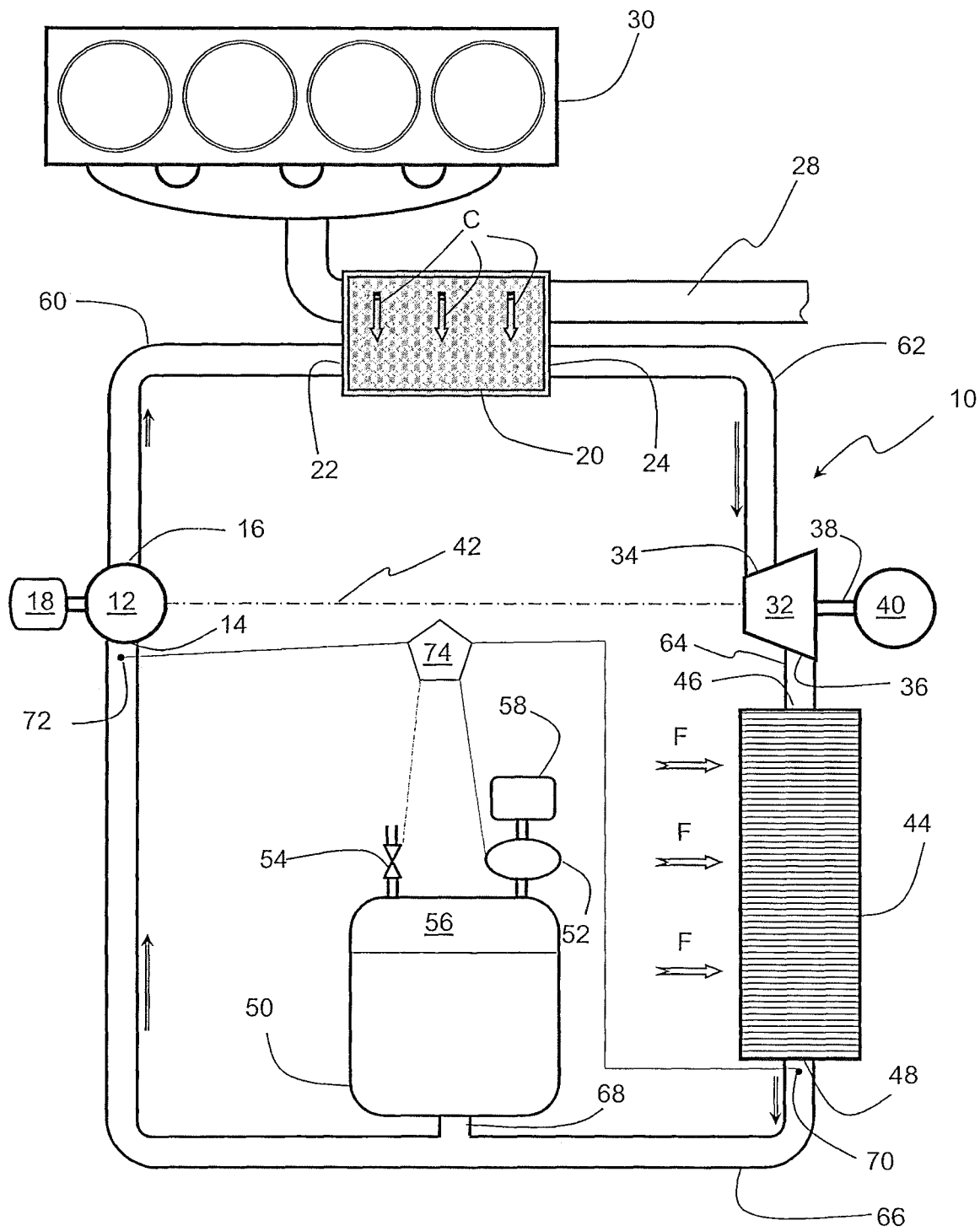

SYSTEM AND METHOD FOR CONTROLLING A CLOSED LOOP WORKING ON A RANKINE CYCLE WITH A TANK AND A PRESSURE REGULATING DEVICE

CROSS REFERENCE TO RELATED APPLICATION

Reference is made to French Application Serial No. 14/53.388, filed Apr. 16, 2014, which application is incorporated herein by reference in its entirety.

BACKGROUND OF THE INVENTION

Field of the Invention

The present invention relates to a system and method for controlling a closed loop working on a Rankine cycle.

Description of the Prior Art

As it is widely known, a Rankine cycle is a thermodynamic cycle wherein heat coming from an external heat source is transmitted to a closed loop containing a working fluid.

There are many types of Rankine cycle loops and more particularly those involving a working fluid phase change (liquid and vapor).

This type of cycle is generally broken up into a stage where the working fluid used in liquid form is compressed in an isentropic manner, followed by a stage where this compressed liquid fluid is heated and vaporized on contact with a heat source.

This vapor is then expanded, in another stage, in an isentropic manner in an expansion machine, then, in a last stage, the expanded vapor is cooled and condensed on contact with a cold source.

To carry out these various stages, the loop comprises a compressor pump for circulating and compressing the fluid in liquid form, an evaporator that is swept by a hot fluid for at least partial vaporization of the compressed fluid, an expansion machine for expanding the vapor, such as a turbine that converts the energy of this vapor into another energy such as a mechanical or electrical energy, and a condenser from which heat contained in the vapor is liberated to a cold source, which is generally outside air that sweeps this condenser, to convert this vapor into a fluid in liquid form.

In this type of loop, the fluid used is generally water, but other types of fluids, such as organic fluids or organic fluid mixtures for example, can also be used.

By way of example, these organic fluids can be butane, ethanol, hydrofluorocarbons, ammonia, carbon dioxide, etc.

It is also well known, notably from French Patent 2,884,555, to use the calorific energy conveyed by the exhaust gas of internal-combustion engines, in particular those used for motor vehicles, as the hot source providing heating and vaporization of the fluid flowing through the evaporator.

This allows improvement of the energy efficiency of the engine by recovering a large part of the energy lost at the exhaust in order to convert lost heat energy into an energy form that can be used for the motor vehicle through the Rankine cycle loop.

The Rankine cycle loop thus improves the engine efficiency and contributes to the reduction of the consumption and emissions thereof.

Within the context of mobile applications, notably in the field of transport, access to a cold source for condensation of the working fluid of a Rankine cycle loop is not always easy and, in some cases, it can be energy consuming.

Furthermore, using a low boiling point working fluid such as organic fluids (HFCs notably) to carry out an ORC (Organic Rankine Cycle) does not guarantee that condensation or even subcooling of the fluid at the condenser outlet can be reached. In the absence of sufficient fluid subcooling, there is a certain risk of cavitation at the compressor pump inlet in case of sudden pressure decrease linked with the suction of the fluid into the pump inlet.

To guarantee non-cavitation of the pump on the loop, it is already known, from U.S. Pat. No. 7,174,732 to manage subcooling through the use of forced ventilation at the condenser, which allows an increase in the exchange power thereof and lowering of the fluid temperature at the outlet.

This option involves the significant drawback of being energetically consuming because it leads to a high energy consumption related to the ventilation, which has a detrimental impact of the efficiency of the Rankine recovery cycle.

SUMMARY OF THE INVENTION

The present invention overcomes the aforementioned drawbacks by providing an alternative to temperature decrease while guaranteeing an absence of cavitation risk at the inlet of the pump, even during transient operation thereof.

The invention thus relates to a system and method for controlling a closed loop working on a Rankine cycle. The loop comprises a compression and circulation pump for the fluid in liquid form, a heat exchanger swept by a hot source for evaporation of the fluid, an expansion device for expanding the fluid in vapor form, a cooling exchanger swept by a cold source for condensation of the working fluid, a working fluid tank and working fluid circulation lines. The tank is connected to a pressure regulating device.

The pressure regulating system can comprise a pressure reducing control valve associated with a discharge.

The discharge can comprise a valve.

The pressure control valve can be connected, on the one hand, to the tank and, on the other hand, to a pressure source.

The pressure source can comprise air or nitrogen.

The tank can comprise an expandable part intended to receive the tank headspace.

The invention also relates to a method of controlling a closed loop working on a Rankine cycle, the loop comprising a compression and circulation pump for the fluid in liquid form, a heat exchanger swept by a hot source for evaporation of the fluid, an expansion device for expanding the fluid into vapor, a cooling exchanger swept by a cool source for condensation of the working fluid, a working fluid tank and working fluid circulation lines, characterized in providing regulation of the pressure within the tank.

The method adjusting a pressure control valve connected to the tank to a value such that the set pressure is in the region of the saturation pressure of the fluid at the cooling exchanger outlet.

The method can, when the loop is at standstill, produce a pressure above atmospheric pressure to prevent outer air inflow.

BRIEF DESCRIPTION OF THE DRAWING

Other features and advantages of the invention will be clear from reading the description of the sole FIGURE that shows a system for controlling a closed loop working on a Rankine cycle.

DETAILED DESCRIPTION OF THE INVENTION

In the FIGURE, Rankine cycle closed loop 10 comprises a compression and circulation positive-displacement pump 12 for a working fluid, referred to as the pump in the rest of the description for reasons of simplification, with an inlet 14 for the working fluid in liquid form and an outlet 16 for the working fluid, also in liquid form but which has been compressed at high pressure. This pump is advantageously driven in rotation by an electric motor 18.

By way of example only, the working fluid used here is a fluid known as R245fa ($C_3H_3F_5$) from Honeywell or HFE7100 ($C_5H_3F_9O$) from the 3M Company or R365mfc ($C_4H_5F_5$) from the Solvay Company.

This loop also comprises a heat exchanger 20, which is referred to as evaporator and is traversed by the compressed working fluid between an inlet 22 for the liquid fluid and an outlet 24 through which the working fluid flows out of the evaporator as compressed vapor. This evaporator is swept by a hot source (arrow C) coming from the exhaust gas circulating in exhaust line 28 of an internal-combustion engine 30, and more particularly an engine for motor vehicles.

This loop also comprises an expansion machine 32 which receives the working fluid at inlet 34 in the form of high-pressure compressed vapor. This fluid flows out through outlet 36 of the machine as a low-pressure expanded vapor.

Advantageously, the expansion machine 32 can be an expansion turbine whose rotor is driven in rotation by the working fluid in vapor form while driving a connecting shaft 38. Preferably, this shaft transmits the energy recovered to any transforming device such as, for example, an electric generator 40.

The expansion machine 32 can also be a reciprocating piston or a rotary piston machine whose output shaft is connected to the transforming device.

As illustrated in dotted line in the FIGURE, the expansion machine 32 can also have a driven shaft 42 connected to the rotor of the machine to the rotor of the pump 12. In this configuration, motor 18 of the pump can be advantageously be eliminated and the rotor of the pump is then driven by the rotation of the rotor of the turbine 32 to which it is connected by shaft 42.

The loop also comprises a cooling exchanger 44, or condenser, having an inlet 46 for receiving the expanded low pressure vapor and an outlet 48 for discharging the working fluid which has been converted to liquid form after passing through the condenser. The condenser is swept by a cooling source, generally a cool air stream (arrow F) at ambient temperature, in order to cool the expanded vapor so that it condenses and is converted to liquid. Of course, any other cooling source such as water can be used to provide condensation of the vapor.

This loop also has a closed tank 50 for retaining the working fluid in the liquid state.

This tank includes a pressure regulating system that comprises a pressure control valve 52 which when opened increases pressure in the headspace 56 and which is associated with a discharge valve 54 and control 74 which operate as a system. The pressure control valve is coupled through the headspace 56 to the discharge valve.

The pressure control valve 52 is connected, on the one hand, to headspace gas 56, generally air, present in the upper part of tank 50 and, on the other hand, to a pressure source 58 of pressurized gas such as air or nitrogen. The pressure control valve 52, the discharge valve 54 and control 74 function as a system which provides controlled pressurization inside the tank 50 and more particularly the headspace 56 thereof.

The various elements of the loop are connected to each other by fluid circulation lines 60, 62, 64, 66 and 68 allowing connection of the pump to the evaporator (evaporator line 60), the evaporator to the turbine (turbine line 62), the turbine to the condenser (condenser line 64), the condenser to the pump (pump line 66), and the pump line to the tank (tank line 68).

Furthermore, the loop comprises a temperature detector 70 arranged on tank line 68 at the outlet of condenser 44 and a pressure detector 72 on line 68 at the inlet of pump 14.

A control 74 is also provided for controlling the pressure control valve 52 and optionally the discharge valve 54 which form a system. The control 74 receives information from these detectors and from any other detectors present in the loop.

During operation of the loop, control 74 controls pressure control valve 52 with a set value such that the pressure in tank 50 reaches the saturation pressure of the working fluid at the outlet of condenser 44 with a subcooling safety margin (10° C. for example).

By way of example only, for a temperature of 85° C. measured by detector 70 at the condenser outlet corresponding to a saturation pressure of 4 bar of the working fluid, in the case of R365mfc for example, the pressure control valve 52 is controlled to maintain a set value at a pressure of 5.2 bar which is equivalent to the saturation pressure of the fluid at a temperature of 95° C.

Thus configured, the pressure control valve constantly ensures that the fluid at the pump inlet has a sufficient subcooling level (10° C. in this example) with nearly total absence of fluid in the vapor or gas phase, which avoids cavitation risks at the pump.

When the pump operates under transient conditions, pressure control valve 52 associated with discharge valve 54 regulates the pressure at the inlet of the pump. The transient operation of the pump occurs during transient operation of the heat source (thermal energy increase or decrease) that requires continuous adjustment of the heat carrier flow rate in the Rankine cycle so as to keep the temperature thereof at the evaporator outlet stable.

Thus, when the pump increases its circulating flow rate, the level of the working fluid present in tank 50 decreases. This level decrease then leads to a pressure decrease in tank headspace 56. The pressure decrease is then compensated for by actuating the pressure control valve 52 allowing entry of the pressurized air or nitrogen under pressure from the pressurized source 58 into the tank until the pressure increases to a level which is required at the pump inlet, to ensure favorable condensation conditions at the condenser outlet.

Conversely, when pump 12 reduces its circulating flow rate, the working fluid flow returning from condenser 44 to tank 50 is greater than the initial flow of the fluid from this tank to the pump. The level in the tank therefore increases, thus leading to a pressure increase in headspace 56.

Opening of the discharge valve 54 is then controlled by either control 74 or automatically in order to discharge part of the headspace gas, thus limiting the pressure increase in the tank that might be detrimental to the efficiency of the recovery cycle.

Of course, without departing from the scope of the invention, variable pressure adjustment of the pressure control valve 52, controlled by the saturation pressure of the fluid temperature measured at the condenser outlet 48 can be provided.

Also, a tank with an "expandable" headspace, using for example a bladder, can be provided to isolate the working fluid from the pressurized fluid to prevent harmful discharge to the atmosphere, through the discharge valve, of the working fluid in vapor form when the vapor is harmful to the environment.

With the regulating system, optimum adjustment of the pressure in the low-pressure part of the loop is thus ensured (line 66, line 68 and tank 520). This obtains good condensation of the working fluid without cavitation risk to the pump 12 while limiting the efficiency decrease of the recovery cycle inherent with a pressure increase in the low-pressure part of the loop.

Furthermore, when the loop is at standstill, the elements thereof cool down to the temperature of the outside environment, which may in some cases be below 0° C.

Under such conditions, the pressure in the loop will be, without any particular device, the saturated vapor pressure of the fluid at this temperature.

For some heat carriers, the saturated vapor pressure will be strongly subatmospheric, thus generating a risk of air intrusion into the loop during longer standstill periods. In order to guard against this effect, which is likely to interfere with the proper operation of the recovery loop upon restarting, the tank needs to be pressurized to a value slightly above atmospheric pressure by control of the pressure control valve 52, so that no outer air intrusion may occur.

The invention claimed is:

1. A system for controlling a closed loop Rankine cycle using a working fluid comprising:
a compression and circulation pump having an input and an output, which pumps working fluid including during standstill and transient flow, a pressure detector coupled to the input of the pump for measuring pressure of the working fluid at the input of the pump, a heat exchanger coupled to the output of the pump which is swept by a heat source for heating the working fluid, an expansion machine coupled to an output of the heat exchanger for expanding the working fluid and rotating an output shaft of the expansion machine, a condenser which is coupled to the working fluid provided from an output of the expansion machine and which is swept by a cooling fluid for condensing the expanded working fluid, a temperature detector located at an outlet of the condenser for detecting temperature of condensed working fluid, a working fluid tank located between the condenser and the pump in the closed loop of the Rankine cycle, which is coupled to the outlet of the condenser and stores liquid working received from the condenser, the working fluid tank having a headspace which stores gas above a level of liquid working fluid stored in the working fluid tank, and working fluid circulation lines for circulating the working fluid in the closed Rankine cycle loop;
a pressure regulating system including means for controlling pressure of the gas in the headspace which is coupled to the pressure detector, to the temperature detector, and to a pressure reducing valve and to a discharge valve, which are coupled to the headspace, the pressure reducing valve being coupled to a source of pressurized gas, and the discharge valve discharging part of the headspace gas, the pressure regulating system regulating pressure of the working fluid at the input of the pump during the transient flow, the means for controlling pressure controlling the pressure of the gas in the headspace by opening and closing of the pressure reducing valve and the discharge valve, the pressure reducing valve being open when the pump increases the flow of the working fluid which allows the pressurized gas to flow from the source of pressurized gas into the headspace, with the flow of working fluid maintaining a sub-cooling level of the working fluid at the input of the pump to prevent cavitation of the pump caused by the pressure of the working fluid at the input of the pump, the means for controlling pressure also controlling the pressure reducing valve and the discharge valve to provide a set pressure so that the tank reaches saturation pressure of the working fluid at the outlet of the condenser with a sub-cooling safety margin and the means for controlling pressure also controls the pressure reducing valve which produces a pressure above atmospheric pressure in the tank which prevents outside air flow into the tank when the closed loop is at standstill, and wherein, when the pump reduces its circulating flow rate, the means for controlling pressure control controls the opening of the discharge valve for discharging part of the headspace gas, and wherein, when the pump operates during transient operation of the heat source which provides continuous adjustment of a heat carrier flow rate in the Rankine cycle to keep the temperature thereof at the output of the heat exchanger stable.

2. The system as claimed in claim 1, wherein the source of pressurized gas comprises a source of pressurized air or nitrogen.

3. The system as claimed in claim 1, wherein the working fluid tank includes an expandable part including the headspace.

4. The system as claimed in claim 2, wherein the working fluid tank includes an expandable part including the headspace.

5. A method in a system for controlling a closed loop Rankine cycle using a working fluid including a compression and circulation pump having an input and an output which pumps the working fluid including during standstill and transient flow, a pressure detector coupled to the input of the pump for measuring pressure of the working fluid at the input of the pump, a heat exchanger coupled to the output of the pump which is swept by a heat source for heating the working fluid, an expansion machine coupled to an output of the heat exchanger for expanding the working fluid and rotating an output shaft of the expansion machine, a condenser which is coupled to the working fluid provided from an output of the expansion machine and which is swept by a cooling fluid for condensing the expanded working fluid, a temperature detector located at an outlet of the condenser for sensing temperature of the condensed working fluid, a working fluid tank located between the condenser and the pump in the closed loop of the Rankine cycle, which is coupled to the outlet of the condenser and stores working fluid received from the condenser, the working fluid tank having a headspace which stores gas above a level of liquid working fluid stored in the working fluid tank, working fluid circulation lines for circulating the working fluid in the closed loop of the Rankine cycle, a pressure regulating system including a means for controlling pressure of the gas in the headspace which is coupled to the pressure detector, to the temperature detector, and to a pressure reducing valve and to a discharge valve, which are coupled to the headspace, the pressure reducing valve being coupled to a source of pressurized gas, the discharge valve discharging part of the headspace gas, the pressure regulating system regulating pressure of the working fluid at the input of the pump including during the transient flow, and which receives information from the pressure detector and the temperature detector and controls pressure of the gas in the headspace, the method comprising steps of:

sensing the pressure at the input of the pump and the temperature of the condensed working fluid; and controlling the pressure within the headspace of the tank under control of the means for controlling pressure of the gas by opening and closing the pressure reducing valve and the discharge valve, the pressure reducing valve being open when the pump increases the flow of the working fluid which allows the pressurized gas to flow from the source of pressurized gas into the headspace, with the flow of working fluid maintaining a sub-cooling level of the working fluid at the input of the pump which prevents cavitation by the pump caused by the pressure of the working fluid at the input of the pump, the means for controlling also controlling the pressure reducing valve to produce a pressure above atmospheric pressure in the tank which prevents outer air from flowing into the tank when the closed loop is at standstill, and wherein, when the pump reduces its circulating flow rate, the means for controlling pressure control controls the opening of the discharge valve for discharging part of the headspace gas, and wherein, when the pump operates during transient operation of the heat source which provides continuous adjustment of a heat carrier flow rate in the Rankine cycle to keep the temperature thereof at the output of the heat exchanger stable.

6. The method as claimed in claim 5, wherein the source of pressurized gas comprises a source of pressurized air or nitrogen.

7. The method as claimed in claim 5, wherein the working fluid tank includes an expandable part including the headspace.

8. The method as claimed in claim 6, wherein the working fluid tank includes an expandable part including the headspace.

* * * * *